Patented Oct. 25, 1932

1,885,065

UNITED STATES PATENT OFFICE

SAMUEL von ALLMEN, OF BASEL, SWITZERLAND, ASSIGNOR TO THE FIRM: CHEMICAL WORKS FORMERLY SANDOZ, OF BASEL, SWITZERLAND

EASILY SOLUBLE DYESTUFFS OF THE ANTHRAQUINONE SERIES

No Drawing. Application filed December 14, 1929, Serial No. 414,235, and in Germany December 20, 1928.

The present invention relates to new dyestuffs of the anthraquinone series easily soluble in water and dyeing wool and silk from an acid dye-bath in blue tints of excellent fastness. Owing to the good solubility of these new dyestuffs they may advantageously be used for printing purposes.

The new dyestuffs correspond to the general formula:

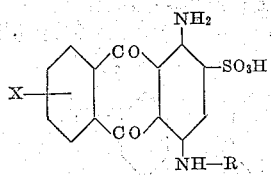

wherein R stands for an aromatic radical and X for a sulphonic group linked to the benzene ring.

The new dyestuffs can be manufactured by heating the beta-halogen derivatives of arylaminoanthraquinones heteronuclearly sulphonated in alpha- and beta-position with sulphite in presence of water; addition of phenol or similarly acting compounds is not absolutely necessary, but may be used.

The course of this reaction is surprising because it could not have been foreseen that the heteronuclear sulphonic groups would remain unaltered.

The new dyestuffs constitute in dry pulverized state blue powders which are easily soluble in water with a blue color. With strong acids they form salts, for example with hydrochloric acid they yield soluble red-violet hydrochlorides.

The following examples illustrate the manufacture of these new dyestuffs, the parts being by weight.

Example 1

10 parts of the sodium salt of 1-amino-2-bromo-4-anilidoanthraquinone-8-sulphonic acid, 40 parts of phenol and 20 volume-parts of a potassium sulphite solution of 33% are heated in an autoclave at 130° C. until no unaltered starting material can be identified.

Thereupon the phenol is extracted with an organic solvent, for example with benzene, and the dyestuff is precipitated by means of potassium chloride. It precipitates in form of beautiful small crystals which possess a bronze lustre. In dry pulverized state it constitutes a dark blue powder, which easily dissolves in water to a pure blue solution. When dissolved in sulphuric acid it yields a green-grey solution which becomes dull blue on addition of boric acid. It dissolves in hydrochloric acid with a red-violet color, but is insoluble in cold benzene and ethylacetate. It dyes wool of very pure blue tints of excellent fastness, especially of a good fastness to light. The shade is not altered in the artificial light.

Example 2

20 parts of the sodium salt of 1-amino-2-bromo-4-anilidoanthraquinone-8-sulphonic acid are heated under pressure with 80 volume-parts of a potassium sulphite solution of 16½%, until no difficultly soluble bromine derivative can be identified. After cooling the dyestuff is salted out, filtered and washed with a saturated sodium chloride solution. The resulting dyestuff is identical to the dyestuff obtained in Example 1.

Example 3

20 parts of the sodium salt of 1-amino-2-bromo-4-para-toluidoanthraquinone-5-sulphonic acid, 40 parts of phenol and 40 volume-parts of a potassium sulphite solution of 33% are heated in an autoclave to 125° C., until the reaction is complete. The phenol is removed as indicated in Example 1 or by blowing out with steam and the dyestuff is precipitated by means of potassium chloride in form of fine blue-gray crystals. In dry pulverized state it constitutes a dark blue powder, which easily dissolves in cold water to a greenish blue solution. When dissolved in sulphuric acid it yields a pale greenish-yellow solution which becomes blue on addition of boric acid. It dissolves in hydrochloric acid with a red-violet color, but is insoluble in cold benzene and ethylacetate. It dyes wool of green-blue shades and possesses the same fastness properties as the product of Example 1. Owing to the fact, that the dyestuff has a good solubility, it is suitable for wool and silk printing.

Example 4

16 parts of the sodium salt of 1-amino-2-bromo-4-para-aminoacetanilidoanthraquinone-5-sulphonic acid, 80 parts of phenol and 35 volume-parts of a potassium sulphite solution of 33% are heated in an autoclave at 125° C. until the reaction is finished.

The phenol is removed as mentioned above and the dyestuff is precipitated by means of potassium chloride in form of very small greenish-blue crystals. In dry pulverized state it constitutes a black-blue powder, which easily dissolves in cold water to a greenish-blue solution. When dissolved in sulphuric acid it yields a pale green-grey solution, which becomes dull grey-blue on addition of boric acid. It dissolves in hydrochloric acid with a red-violet shade, but is insoluble in cold benzene and ethylacetate. It dyes wool a bright greenish-blue shade of excellent fastness and may be employed for printing purposes.

Example 5

10 parts of the sodium salt of 1-amino-2-bromo-4-anilidoanthraquinone-5-sulphonic acid are heated on the reflux with 40 parts of phenol and 40 volume-parts of a potassium sulphite solution of 16½% until the original dyestuff has disappeared. After separating the phenol, the dyestuff is salted out. In dry pulverized state it constitutes a dark-blue powder, which easily dissolves in cold water to a blue solution. When dissolved in sulphuric acid it yields a green-grey solution which becomes dull blue on addition of boric acid.

The dyestuff disolves in hydrochloric acid with a red violet color and yields a pale blue solution in cold ethyl-acetate. It dyes wool of a more greenish-blue shade than the dyestuff described in Example 1. With respect to the other properties the two dyestuffs are quite similar.

What I claim is:—

1. The herein described new dyestuffs of the anthraquinone series corresponding to the general formula:

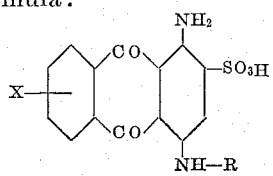

wherein R stands for an aromatic radical and X for a sulphonic group linked to the benzene ring, said dyestuffs constituting in dry pulverized state blue powders easily soluble in cold water with a blue color, soluble in sulphuric acid with a pale greenish color, forming with hydrochloric acid red-violet hydrochlorides, dyeing wool of fast blue tints and being usable for printing purposes.

2. The herein described new dyestuffs of the anthraquinone series corresponding to the general formula:

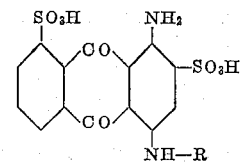

wherein R stands for an aromatic radical, said dyestuffs constituting in dry pulverized state blue powders easily soluble in cold water with a blue color, soluble in sulphuric acid with a pale greenish color, forming with hydrochloric acid red-violet hydrochlorides, dyeing wool of fast blue tints and being usable for printing purposes.

3. The herein described new dyestuff consisting of 1-amino-4-anilidoanthraquinone-2.8-disulphonic acid of the formula:

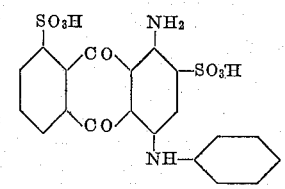

said dyestuff constituting in dry pulverized state a blue powder easily soluble in cold water with a blue color, soluble in sulphuric acid with a pale greenish color, forming with hydrochloric acid a red-violet soluble hydrochloride, dyeing wool of fast blue tints, the shade being not altered in artificial light, and being usable for printing wool and silk.

In witness whereof I have hereunto signed my name this 29th day of November, 1929.

SAMUEL von ALLMEN.